US012056006B1

(12) United States Patent
Bishop et al.

(10) Patent No.: US 12,056,006 B1
(45) Date of Patent: Aug. 6, 2024

(54) PROACTIVE REMEDIATION FOR INFORMATION TECHNOLOGY ASSETS

(71) Applicant: Dell Products L.P., Round Rock, TX (US)

(72) Inventors: Militza Bishop, Decatur, TX (US); Alexander Hutchings, Round Rock, TX (US); Brenda Palma Guizar, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 11 days.

(21) Appl. No.: 18/134,163

(22) Filed: Apr. 13, 2023

(51) Int. Cl.
G06F 11/07 (2006.01)

(52) U.S. Cl.
CPC ...... *G06F 11/0793* (2013.01); *G06F 11/0709* (2013.01)

(58) Field of Classification Search
CPC .......................... G06F 11/0793; G06F 11/0709
See application file for complete search history.

(56) References Cited

U.S. PATENT DOCUMENTS

| | | | | |
|---|---|---|---|---|
| 2022/0365525 | A1* | 11/2022 | Minisankar | G06N 20/00 |
| 2023/0045896 | A1* | 2/2023 | Malik | G06F 9/5077 |

OTHER PUBLICATIONS

Dell Inc., "Dell SupportAssist Agent User's Guide," Rev. A00, Feb. 2015, 15 pages.
Dell Technologies, "Dell CloudIQ: A Detailed Review," H15691.7 White Paper, Jan. 2023, 189 pages.
Dell Technologies, "SupportAssist for Business PCs," Sep. 2021, 14 pages.
A. Kobusinska et al., "Device Fingerprinting: Analysis of Chosen Fingerprinting Methods," Proceedings of the 2nd International Conference on Internet of Things, Big Data and Security, Apr. 2017, pp. 167-177.
Dell EMC, "SupportAssist for Enterprise Systems," Rev. 1.1, Jan. 2016, 2 pages.

* cited by examiner

*Primary Examiner* — Jigar P Patel
(74) *Attorney, Agent, or Firm* — Ryan, Mason & Lewis, LLP

(57) ABSTRACT

An apparatus comprises a processing device configured to obtain monitoring data associated with information technology assets, and to generate, for at least a given one of the information technology assets, a given asset signature representing a status of the given information technology asset based on the obtained monitoring data. The processing device is also configured to determine asset-to-issue similarity between the given asset signature and one or more issue signatures characterizing presence of issue indicators relevant for issue detection for issues encountered on the information technology assets. The processing device is further configured to select, responsive to determining that the given asset signature exhibits at least a threshold level of asset-to-issue similarity with a given issue signature associated with a given issue, proactive remedial actions for remedying the given issue, and to apply the selected proactive remedial actions prior to the given information technology asset encountering the given issue.

20 Claims, 13 Drawing Sheets

| FIX | TEST SAMPLE SIZE | RECEIVER OPERATING CHARACTERISTIC (ROC) AREA UNDER THE CURVE (AUC) | | | | |
|---|---|---|---|---|---|---|
| | | ALL LOGS | BIOS LOGS | CRASH LOGS | DIAGNOSTIC PERFORMANCE EVENT LOGS | APPLICATION ERROR LOGS |
| T0040 | 28 | 0.61 | 0.67 | | | 0.65 |
| T0050 | 373 | | 0.61 | 0.60 | | |
| T0200 | 907 | 0.65 | 0.61 | | 0.66 | 0.62 |
| T0230 | 158 | 0.62 | 0.61 | | | |
| T0301 | 191 | 0.63 | 0.66 | | | 0.61 |
| T0500 | 28 | 0.62 | 0.71 | | 0.62 | |
| T0599 | 228 | 0.65 | 0.71 | | 0.63 | 0.61 |
| T0600 | 71 | 0.62 | | | | 0.62 |
| T0689 | 208 | 0.69 | 0.71 | 0.62 | | 0.64 |
| T0701 | 9 | | | | | |
| T0720 | 44 | 0.63 | 0.70 | | | |
| T0740 | 81 | 0.60 | 0.63 | | | |
| T0751 | 349 | 0.60 | 0.77 | | | |
| T0800 | 609 | 0.65 | | | 0.66 | 0.63 |
| T0951 | 133 | 0.60 | | | | 0.61 |
| T1306 | 25 | 0.65 | | | | 0.68 |
| T1551 | 48 | 0.61 | 0.63 | | | 0.67 |
| T1600 | 259 | 0.72 | | 0.63 | | |
| T1700 | 90 | | | | 0.66 | |
| T2500 | 159 | | 0.60 | 0.62 | | |
| T2800 | 36 | 0.64 | 0.62 | | | |
| T2900 | 55 | 0.65 | 0.73 | | | 0.61 |
| T3250 | 282 | 0.62 | 0.62 | 0.61 | | 0.60 |
| T3451 | 8 | 0.61 | | | 0.90 | |
| T3600 | 318 | 0.66 | 0.63 | 0.64 | 0.67 | 0.67 |

| FIX CODE | DESCRIPTION |
| --- | --- |
| T0040 | NO BOOT |
| T0050 | NO VIDEO OR DISTORTED VIDEO |
| T0200 | SLOW PERFORMANCE, LOCKUP AND FREEZE |
| T0230 | SPONTANEOUS SHUTDOWN/REBOOT |
| T0301 | BATTERY TROUBLESHOOTING |
| T0500 | DOCKING STATION TROUBLESHOOTING |
| T0599 | THERMAL/HEAT ISSUE |
| T0600 | TOUCHPAD/TRACKSTICK TROUBLESHOOTING |
| T0689 | NO AUDIO/DISTORTED AUDIO |
| T0701 | MOUSE TROUBLESHOOTING |
| T0720 | AC ADAPTER TROUBLESHOOTING |
| T0740 | BITLOCKER AND TPM/PTT USAGE AND TROUBLESHOOTING |
| T0751 | HARD DRIVE TROUBLESHOOTING |
| T0800 | OPERATING SYSTEM RE-INSTALLATION |
| T0951 | WIRELESS CONNECTIVITY TROUBLESHOOTING |
| T1306 | BLUETOOTH SETUP AND TROUBLESHOOTING |
| T1551 | OFFICE SOFTWARE CONFIGURATION AND TROUBLESHOOTING |
| T1600 | BLUE SCREEN STOP ERROR |
| T1700 | WINDOWS UPGRADE/UPDATE CONFIGURATION AND TROUBLESHOOTING |
| T2500 | SLEEP AND HIBERNATE TROUBLESHOOTING |
| T2800 | MULTI-MONITOR SETUP AND TROUBLESHOOTING |
| T2900 | WEBCAM TROUBLESHOOTING |
| T3250 | DRIVERS, FIRMWARE, BIOS |
| T3451 | PRODUCT KEY AND ACTIVATION TROUBLESHOOTING |
| T3600 | MICROPHONE TROUBLESHOOTING |

FIG. 9B

PROACTIVE REMEDIATION FOR INFORMATION TECHNOLOGY ASSETS

FIELD

The field relates generally to information processing, and more particularly to management of information processing systems.

BACKGROUND

As the value and use of information continues to increase, individuals and businesses seek additional ways to process and store information. Information handling systems and other types of information processing systems may be used to process, compile, store and communicate various types of information. Because technology and information handling needs and requirements vary between different users or applications, information handling systems may also vary (e.g., in what information is handled, how the information is handled, how much information is processed, stored, or communicated, how quickly and efficiently the information may be processed, stored, or communicated, etc.). Information handling systems may be configured as general purpose, or as special purpose configured for one or more specific users or use cases (e.g., financial transaction processing, airline reservations, enterprise data storage, global communications, etc.). Information handling systems may include a variety of hardware and software components that may be configured to process, store, and communicate information and may include one or more computer systems, data storage systems, and networking systems.

SUMMARY

Illustrative embodiments of the present disclosure provide techniques for proactive remediation for information technology assets in an information technology infrastructure.

In one embodiment, an apparatus comprises at least one processing device comprising a processor coupled to a memory. The at least one processing device is configured to obtain monitoring data associated with a plurality of information technology assets in an information technology infrastructure, and to generate, for at least a given one of the plurality of information technology assets, a given asset signature based at least in part on the obtained monitoring data, the given asset signature representing a status of the given information technology asset. The at least one processing device is also configured to determine asset-to-issue similarity between the given asset signature and one or more issue signatures, the one or more issue signatures characterizing presence of a plurality of issue indicators relevant for issue detection for one or more issues encountered on one or more of the plurality of information technology assets. The at least one processing device is further configured to select, responsive to determining that the given asset signature exhibits at least a threshold level of asset-to-issue similarity with at least a given one of the one or more issue signatures associated with at least a given one of the one or more issues, one or more proactive remedial actions for remedying the given issue, and to apply the selected one or more proactive remedial actions to the given information technology asset prior to detecting that the given information technology asset has encountered the given issue.

These and other illustrative embodiments include, without limitation, methods, apparatus, networks, systems and processor-readable storage media.

BRIEF DESCRIPTION OF THE DRAWINGS

FIGS. 9A and 9B show tables illustrating validation of the importance of different data sources for predicting known issues in an illustrative embodiment.

DETAILED DESCRIPTION

Illustrative embodiments will be described herein with reference to exemplary information processing systems and associated computers, servers, storage devices and other processing devices. It is to be appreciated, however, that embodiments are not restricted to use with the particular illustrative system and device configurations shown. Accordingly, the term "information processing system" as used herein is intended to be broadly construed, so as to encompass, for example, processing systems comprising cloud computing and storage systems, as well as other types of processing systems comprising various combinations of physical and virtual processing resources. An information processing system may therefore comprise, for example, at least one data center or other type of cloud-based system that includes one or more clouds hosting tenants that access cloud resources.

Figure 1:
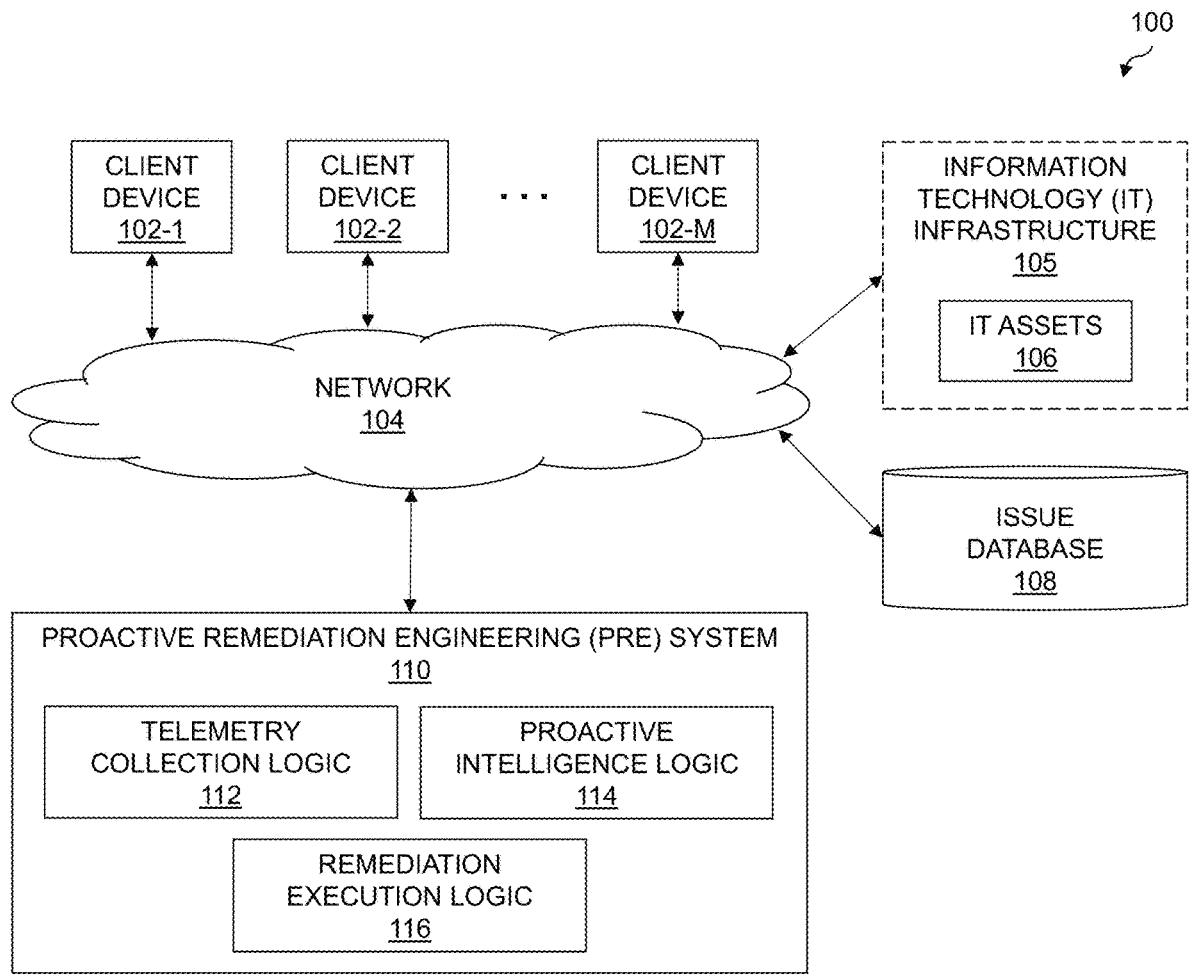
FIG. 1 is a block diagram of an information processing system configured for proactive remediation for information technology assets of an information technology infrastructure in an illustrative embodiment.

FIG. 1 shows an information processing system 100 configured in accordance with an illustrative embodiment. The information processing system 100 is assumed to be built on at least one processing platform and provides functionality for proactive remediation for information technology (IT) assets. The information processing system 100 includes a set of client devices 102-1, 102-2, . . . 102-M (collectively, client devices 102) which are coupled to a network 104. Also coupled to the network 104 is an IT infrastructure 105 comprising one or more IT assets 106, an issue database 108, and a proactive remediation engineering (PRE) system 110. The IT assets 106 may comprise physical and/or virtual computing resources in the IT infrastructure 105. Physical computing resources may include physical hardware such as servers, storage systems, networking equipment, Internet of Things (IoT) devices, other types of processing and computing devices including desktops, laptops, tablets, smartphones, etc. Virtual computing resources may include virtual machines (VMs), containers, etc.

In some embodiments, the PRE system 110 is used for an enterprise system. For example, an enterprise may subscribe to or otherwise utilize the PRE system 110 for managing its assets (e.g., IT assets 106 in the IT infrastructure 105). As used herein, the term "enterprise system" is intended to be construed broadly to include any group of systems or other computing devices. For example, the IT assets 106 of the IT infrastructure 105 may provide a portion of one or more enterprise systems. A given enterprise system may also or alternatively include one or more of the client devices 102. In some embodiments, an enterprise system includes one or more data centers, cloud infrastructure comprising one or more clouds, etc. A given enterprise system, such as cloud infrastructure, may host assets that are associated with multiple enterprises (e.g., two or more different business, organizations or other entities).

The client devices 102 may comprise, for example, physical computing devices such as IoT devices, mobile telephones, laptop computers, tablet computers, desktop computers or other types of devices utilized by members of an enterprise, in any combination. Such devices are examples of what are more generally referred to herein as "processing devices." Some of these processing devices are also generally referred to herein as "computers." The client devices 102 may also or alternately comprise virtualized computing resources, such as VMs, containers, etc.

The client devices 102 in some embodiments comprise respective computers associated with a particular company, organization or other enterprise. Thus, the client devices 102 may be considered examples of assets of an enterprise system. In addition, at least portions of the information processing system 100 may also be referred to herein as collectively comprising one or more "enterprises." Numerous other operating scenarios involving a wide variety of different types and arrangements of processing nodes are possible, as will be appreciated by those skilled in the art.

The network 104 is assumed to comprise a global computer network such as the Internet, although other types of networks can be part of the network 104, including a wide area network (WAN), a local area network (LAN), a satellite network, a telephone or cable network, a cellular network, a wireless network such as a WiFi or WiMAX network, or various portions or combinations of these and other types of networks.

The issue database 108 is configured to store and record various information that is utilized by the PRE system 110 for proactively determining ones of the IT assets 106 (and possibly ones of the client device 102) which are potentially affected by one or more issues. The issue database 108, for example, may store issue patterns or signatures, as well as asset signatures (e.g., for respective ones of the IT assets 106 and/or client devices 102, for groups of two or more of the IT assets 106 and/or client devices 102), etc. The issue database 108 may further store or record information relating to remediation actions (e.g., remediation scripts) for different issues, as well as feedback regarding the effectiveness of different remediation actions for different issues. In some embodiments, one or more of the storage systems utilized to implement the issue database 108 comprise a scale-out all-flash content addressable storage array or other type of storage array.

The term "storage system" as used herein is therefore intended to be broadly construed, and should not be viewed as being limited to content addressable storage systems or flash-based storage systems. A given storage system as the term is broadly used herein can comprise, for example, network-attached storage (NAS), storage area networks (SANs), direct-attached storage (DAS) and distributed DAS, as well as combinations of these and other storage types, including software-defined storage.

Other particular types of storage products that can be used in implementing storage systems in illustrative embodiments include all-flash and hybrid flash storage arrays, software-defined storage products, cloud storage products, object-based storage products, and scale-out NAS clusters. Combinations of multiple ones of these and other storage products can also be used in implementing a given storage system in an illustrative embodiment.

Although not explicitly shown in FIG. 1, one or more input-output devices such as keyboards, displays or other types of input-output devices may be used to support one or more user interfaces to the PRE system 110, as well as to support communication between the PRE system 110 and other related systems and devices not explicitly shown.

The client devices 102 are configured to access or otherwise utilize the IT infrastructure 105. In some embodiments, the client devices 102 are assumed to be associated with system administrators, IT managers or other authorized personnel responsible for managing the IT assets 106 of the IT infrastructure 105. For example, a given one of the client devices 102 may be operated by a user to access a graphical user interface (GUI) provided by the PRE system 110 to manage one or more of the IT assets 106 of the IT infrastructure 105. The PRE system 110 may be provided as a cloud service that is accessible by the given client device 102 to allow the user thereof to manage one or more of the IT assets 106 of the IT infrastructure 105. In some embodiments, the IT assets 106 of the IT infrastructure 105 are owned or operated by the same enterprise that operates the PRE system 110 (e.g., where an enterprise such as a business provides support for the assets it operates). In other embodiments, the IT assets 106 of the IT infrastructure 105 may be owned or operated by one or more enterprises different than the enterprise which operates the PRE system 110 (e.g., a first enterprise provides support for assets that are owned by multiple different customers, business, etc.). Various other examples are possible.

In some embodiments, the client devices 102 and/or the IT assets 106 of the IT infrastructure 105 may implement host agents that are configured for automated transmission of information regarding issues which are encountered, remediation actions which are applied, feedback regarding the effectiveness of applied remediation actions, etc. It should be noted that a "host agent" as this term is generally used herein may comprise an automated entity, such as a software entity running on a processing device. Accordingly, a host agent need not be a human entity.

The PRE system 110 in the FIG. 1 embodiment is assumed to be implemented using at least one processing device. Each such processing device generally comprises at least one processor and an associated memory, and implements one or more functional modules or logic for controlling certain features of the PRE system 110. In the FIG. 1 embodiment, the PRE system 110 implements telemetry collection logic 112, proactive intelligence logic 114, and remediation execution logic 116. The telemetry collection logic 112 is configured to collect telemetry data and logs from the IT assets 106 or other data sources. The proactive intelligence logic 114 is configured to analyze the collected telemetry data and logs to identify ones of the IT assets 106 (and potentially one or more of the client devices 102) which may be affected by one or more issues (e.g., through pattern analysis matching issue signatures with asset signatures of the IT assets 106, through comparing the asset signature of the IT assets 106 with the asset signature of a given IT asset associated with a support ticket, etc.). The proactive intelligence logic 114 is also configured to select, for such potentially affected ones of the IT assets 106, remediation actions to apply. The remediation execution logic 116 is configured to apply the selected remediation actions to the potentially affected ones of the IT assets 106, and to determine the effectiveness of the applied remediation actions. The remediation execution logic 116 may be configured to roll back any applied remediation actions which are determined to have an effectiveness below some designated threshold effectiveness level. The remediation execution logic 116 is also configured to provide feedback regarding the effectiveness of the applied remediation actions to the proactive intelligence logic 114 (e.g., for continuous learning).

It is to be appreciated that the particular arrangement of the client devices 102, the IT infrastructure 105 and the PRE system 110 illustrated in the FIG. 1 embodiment is presented by way of example only, and alternative arrangements can be used in other embodiments. As discussed above, for example, the PRE system 110 (or portions of components thereof, such as one or more of the telemetry collection logic 112, the proactive intelligence logic 114 and the remediation execution logic 116) may in some embodiments be implemented internal to one or more of the client devices 102 and/or the IT infrastructure 105.

At least portions of the telemetry collection logic 112, the proactive intelligence logic 114 and the remediation execution logic 116 may be implemented at least in part in the form of software that is stored in memory and executed by a processor.

The PRE system 110 and other portions of the information processing system 100, as will be described in further detail below, may be part of cloud infrastructure.

The PRE system 110 and other components of the information processing system 100 in the FIG. 1 embodiment are assumed to be implemented using at least one processing platform comprising one or more processing devices each having a processor coupled to a memory. Such processing devices can illustratively include particular arrangements of compute, storage and network resources.

The client devices 102, IT infrastructure 105, the issue database 108 and the PRE system 110 or components thereof (e.g., the telemetry collection logic 112, the proactive intelligence logic 114 and the remediation execution logic 116) may be implemented on respective distinct processing platforms, although numerous other arrangements are possible. For example, in some embodiments at least portions of the PRE system 110 and one or more of the client devices 102, the IT infrastructure 105 and/or the issue database 108 are implemented on the same processing platform. A given client device (e.g., 102-1) can therefore be implemented at least in part within at least one processing platform that implements at least a portion of the PRE system 110.

The term "processing platform" as used herein is intended to be broadly construed so as to encompass, by way of illustration and without limitation, multiple sets of processing devices and associated storage systems that are configured to communicate over one or more networks. For example, distributed implementations of the information processing system 100 are possible, in which certain components of the system reside in one data center in a first geographic location while other components of the system reside in one or more other data centers in one or more other geographic locations that are potentially remote from the first geographic location. Thus, it is possible in some implementations of the information processing system 100 for the client devices 102, the IT infrastructure 105, IT assets 106, the issue database 108 and the PRE system 110, or portions or components thereof, to reside in different data centers. Numerous other distributed implementations are possible. The PRE system 110 can also be implemented in a distributed manner across multiple data centers.

Additional examples of processing platforms utilized to implement the PRE system 110 and other components of the information processing system 100 in illustrative embodiments will be described in more detail below in conjunction with FIGS. 11 and 12.

It is to be appreciated that these and other features of illustrative embodiments are presented by way of example only, and should not be construed as limiting in any way.

It is to be understood that the particular set of elements shown in FIG. 1 for proactive remediation for the IT assets 106 of the IT infrastructure 105 is presented by way of illustrative example only, and in other embodiments additional or alternative elements may be used. Thus, another embodiment may include additional or alternative systems, devices and other network entities, as well as different arrangements of modules and other components.

It is to be appreciated that these and other features of illustrative embodiments are presented by way of example only, and should not be construed as limiting in any way.

Figure 2:
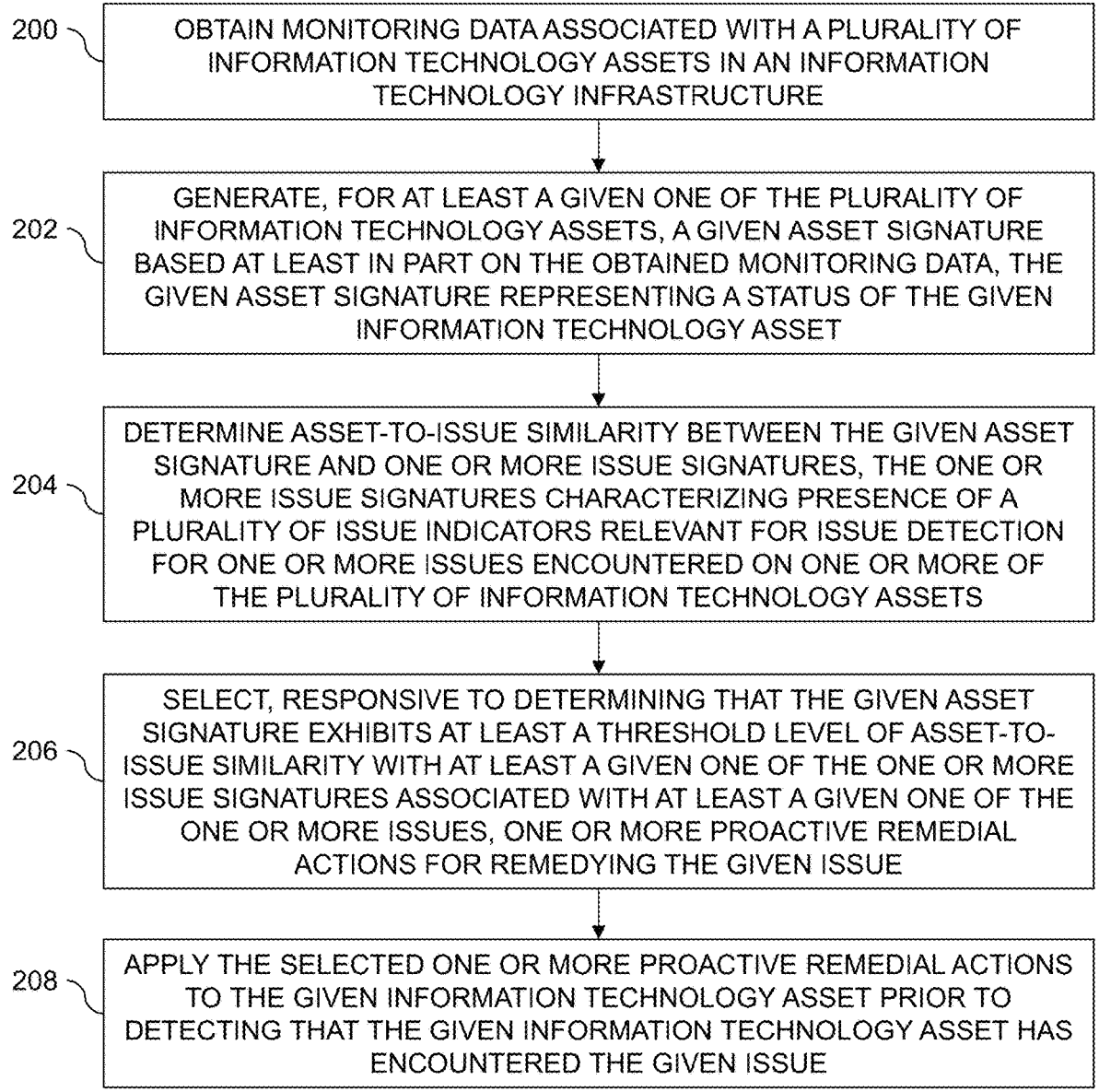
FIG. 2 is a flow diagram of an exemplary process for proactive remediation for information technology assets of an information technology infrastructure in an illustrative embodiment.

An exemplary process for proactive remediation for IT assets of an IT infrastructure will now be described in more detail with reference to the flow diagram of FIG. 2. It is to be understood that this particular process is only an example, and that additional or alternative processes for proactive remediation for IT assets of an IT infrastructure may be used in other embodiments.

In this embodiment, the process includes steps 200 through 208. These steps are assumed to be performed by the PRE system 110 utilizing the telemetry collection logic 112, the proactive intelligence logic 114 and the remediation execution logic 116. The process begins with step 200, obtaining monitoring data associated with a plurality of IT assets (e.g., IT assets 106) in an IT infrastructure (e.g., IT infrastructure 105). The plurality of IT assets may comprise at least one of physical computing resources and virtual computing resources. The obtained monitoring data may comprise telemetry data collected from the plurality of IT assets, logs associated with the plurality of IT assets, and service requests associated with the plurality of IT assets.

In step 202, a given asset signature is generated for at least a given one of the plurality of IT assets. The given asset signature is generated based at least in part on the obtained monitoring data. The given asset signature represents a status of the given IT asset. The obtained monitoring data may comprise, for the given IT asset: one or more support tickets associated with the given IT asset; operating system, application and system logs associated with the one or more support tickets; hardware telemetry data collected from the given IT asset; and software telemetry data collected from one or more operating systems (OSes) and applications running on the given IT asset; crowdsourced issue indicators and at least one of diagnosis and remediation data for the crowdsourced issue indicators; notifications and patches supplied by at least one of an original equipment manufacturer (OEM) and a distributor of the given IT asset; and repair depot data from one or more repair centers.

The given asset signature may comprise a numeric vector encoding whether respective ones of the plurality of issue indicators are observed on the given IT asset. In some embodiments, the given asset signature is generated for a group of two or more of the plurality of IT assets including the given IT asset, and the given asset signature comprises a numeric vector encoding counts of numbers of IT assets in the group of two or more of the plurality of IT assets for which respective ones of the plurality of issue indicators are observed.

In step 204, asset-to-issue similarity is determined between the given asset signature and one or more issue signatures. The one or more issue signatures characterizing presence of a plurality of issue indicators relevant for issue detection for one or more issues encountered on one or more of the plurality of IT assets. Responsive to determining that the given asset signature exhibits at least a threshold level of asset-to-issue similarity with at least a given one of the one or more issue signatures associated with at least a given one of the one or more issues, one or more proactive remedial actions are selected in step 206 for remedying the given issue. The selected one or more proactive remedial actions are applied to the given IT asset prior to detecting that the given IT asset has encountered the given issue. In some embodiments, the given asset signature is generated for a group of two or more of the plurality of IT assets including the given IT asset, and the selected one or more proactive remedial actions are applied to each IT asset in the group of two or more of the plurality of IT assets in step 208. The FIG. 2 process may also include identifying one or more additional ones of the plurality of IT assets having asset signatures exhibiting at least a threshold level of asset-to-asset similarity with the given asset signature, and step 208 may include applying the selected one or more proactive remedial actions to the identified one or more additional ones of the plurality of IT assets.

Step 208 may comprise, for a given one of the one or more proactive remedial actions, determining an applicability coefficient characterizing a probability of success of the given proactive remedial action for remedying the given issue and applicability of the given proactive remedial action based at least in part on the status of the given IT asset. The applicability coefficient may be determined based at least in part on an issue criticality of the given issue, an asset criticality of the given IT asset, and a percentage match between the given asset signature and the given issue signature associated with the given issue. In some embodiments, the given asset signature is generated for a group of two or more of the plurality of IT assets including the given IT asset, and the applicability coefficient is determined based at least in part on a comparison of (i) a number of IT assets in the group of two or more of the plurality of IT assets which are potentially affected by the given issue and (ii) a total number of IT assets in the group of two or more of the plurality of IT assets.

Step 206 may, in some embodiments, include selecting one or more automatically generated remediation scripts based at least in part on the obtained monitoring data and remediation data from one or more additional data sources. The one or more additional data sources may comprise at least one of a repository of previously-generated remediation scripts, patches provided by a hardware vendor of the given IT asset, patches provided by one or more software vendors of software running on the given IT asset, and crowdsourced solution data. Selecting the one or more automatically generated remediation scripts may further be based at least in part on criticality information of the given issue, success rate for remediating the given issue utilizing the one or more automatically generated remediation scripts, and amounts of code in the one or more automatically generated remediation scripts obtained from respective ones of the one or more additional data sources.

With a growing reliance on technology including in work-from-home scenarios, IT teams are facing growing challenges in managing IT assets (e.g., personal computer (PC) "fleets"). The volume of software updates, security patches and optimization activities which are needed to maintain healthy and stable IT assets is becoming overwhelming. Various tools may be used to automate and simplify IT asset management activities through centralized platforms that consolidate insights on the managed IT assets. Such tools may provide self-healing capabilities, proactive recommendations for performance optimization, and the ability to remotely deploy updates and remediation actions on managed IT assets. Tools with remediation capabilities may rely on rules and predictive models for specific issues (e.g., specific hardware failures).

Illustrative embodiments provide technical solutions that utilize a holistic approach to make remediation proactive and scalable (e.g., for a potentially large PC fleet or other group of managed IT assets). The technical solutions described herein utilize artificial intelligence (AI)-curated correlations between telemetry data, log data, diagnoses and remediations. By associating telemetry and log patterns to diagnoses and remediations, the technical solutions described herein are able to proactively look for patterns in managed IT assets (e.g., a PC fleet), and are able to identify and fix potentially affected IT assets before issues become or lead to support tickets, and before end-users get impacted. Advantageously, the technical solutions described herein provide a novel approach for curating logs, telemetry data and other data sources that adds material value to the design of issue remediation. The technical solutions also provide techniques for defining issue "signatures" based on telemetry patterns (and possibly other data) to get recommendations and identify potential issues in a set of managed IT assets. This may include determination of an applicability coefficient, which can inform fleet-wide application of remediation scripts to a group of managed IT assets. The technical solutions described herein also provide an approach for automatic generation of remediation scripts which may be deployed to the group of managed IT assets.

Figure 3:
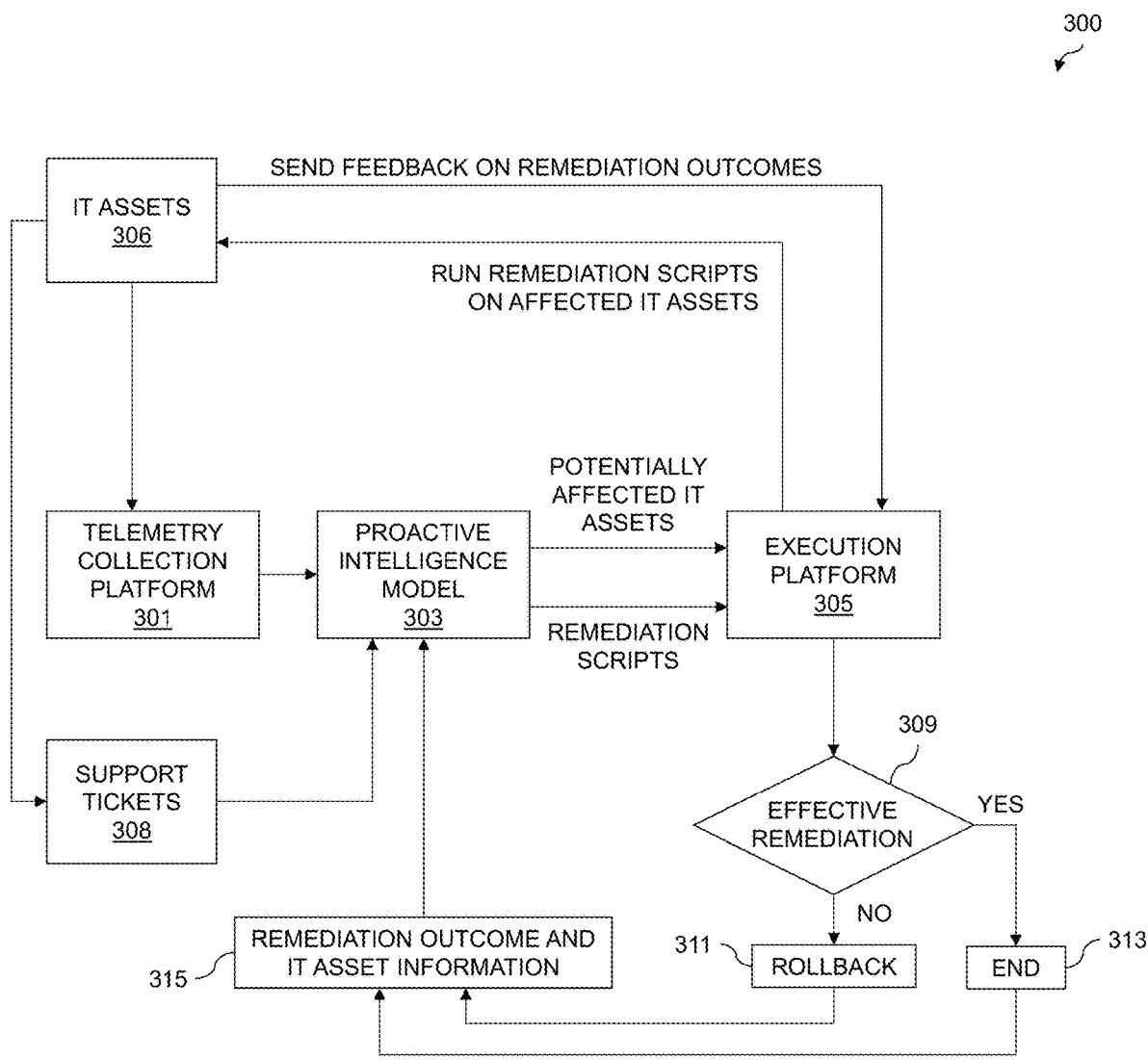
FIG. 3 shows a proactive remediation engineering service configuration in an illustrative embodiment.

A PRE service or system (e.g., PRE system 110) is configured to monitor a fleet or other group of IT assets (e.g., customer PC fleets) for problems and inefficiencies, to utilize cognitive curation to identify problem indicators in telemetry data, and to remediate identified problems using remotely deployed scripts. FIG. 3 shows an overall design of a PRE service 300, which includes a telemetry collection platform 301 (e.g., implemented utilizing telemetry collection logic 112), a proactive intelligence model 303 (e.g., implemented utilizing proactive intelligence logic 114) and an execution platform 305 (e.g., implemented utilizing remediation execution logic 116). The telemetry collection platform 301 is configured to retrieve telemetry data and logs which are associated with a set of managed IT assets 306 (e.g., PCs or other computing devices in a customer PC fleet). The proactive intelligence model 303 is configured to provide cognitive curation capabilities enabling the scalable identification of issues based on the telemetry data collected by the telemetry collection platform 301, as well as log patterns and support tickets 308 which are generated by or associated with the managed IT assets 306. The proactive intelligence model 303 is configured to identify which of the managed IT assets 306 are potentially affected by the identified issues, and also recommend remediation scripts to be applied or other remedial actions to take on the potentially affected ones of the managed IT assets 306. As will be described in further detail below, this may include comparing device or asset signatures of the managed IT assets 306 with signatures of known issues and/or the signatures of devices or other IT assets which are associated with incoming service requests (e.g., support tickets 308).

The execution platform 305 is configured to remotely deploy the remediation scripts (e.g., which are recommended by the proactive intelligence model 303) on the potentially affected ones of the managed IT assets 306. The execution platform 305 is further configured to receive feedback from the managed IT assets 306, where the feedback characterizes remediation outcomes from the remediation scripts which are remotely deployed and run on the potentially affected ones of the managed IT assets 306. In block 309, a determination is made as to whether the remediation scripts provided effective remediation. If the result of block 309 is no for any of the managed IT assets 306, then rollback of the remediation scripts is performed on those ones of the managed IT assets 306 in block 311. If the result of block 309 is yes (e.g., remediation was successful), then no further action is taken on the managed IT assets 306 in block 313. The results of blocks 311 and 313 are used to generate remediation outcome and IT asset information 315 which is provided back to the proactive intelligence model 303 for continuous learning.

The proactive intelligence model 303, in some embodiments, offers both rule-based and cognitive remediation capabilities. Rule-based remediation is based on a predefined rules set over telemetry indicators. These rules come from well-known issues with clear patterns. When a rule is fulfilled, it triggers a remediation or optimization action in the affected ones of the managed IT assets 306, where the remediation or optimization action is deployed through the execution platform 305. Cognitive remediation combines telemetry data and logs into device or asset "signatures" that are used for issue detection and remediation recommendations based on learned associations between (i) the encoded log and telemetry patterns and (ii) issues and remediations. The asset signatures also undergo a similarity search each time a service request (e.g., one of the support tickets 308) is raised. Ones of the managed IT assets 306 which exhibit at least a threshold level of similarity are classified as potentially affected IT assets and become candidates for remediation.

Figure 4:
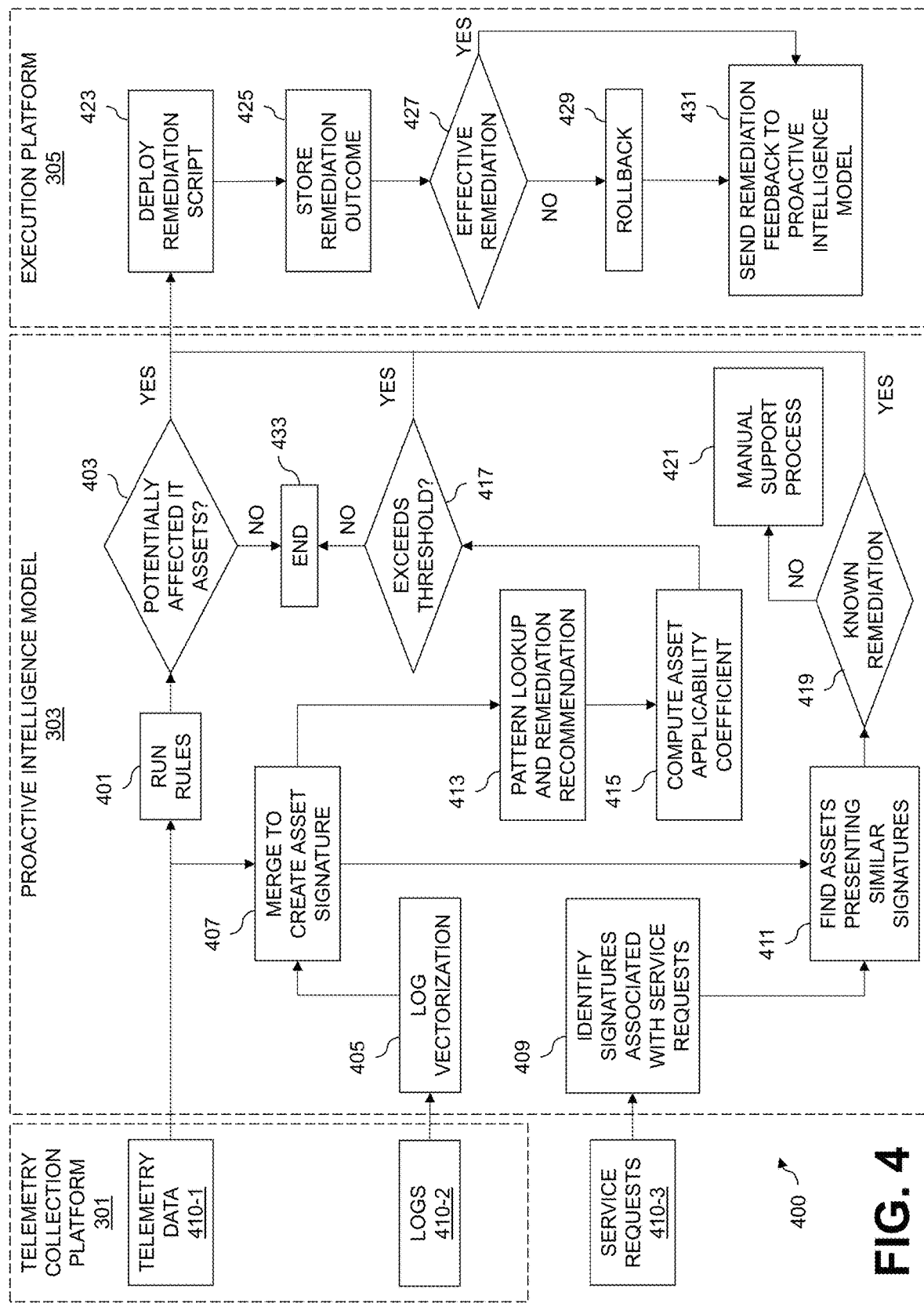
FIG. 4 shows a process flow for performing proactive remediation engineering in an illustrative embodiment.

The PRE service 300 advantageously provides for a novel cognitive remediation process, covering the curation of telemetry and log data, similarity search and pattern lookup algorithms, and determination of "applicability coefficients" to quantify the potential impact of remediation actions. FIG. 4 shows a process flow 400 which may be performed by the PRE service 300. The process flow 400 begins with the proactive intelligence model 303 curating telemetry data 410-1 and logs 410-2 from the telemetry collection platform 301, as well as other data sources including service requests 410-3 (e.g., support tickets) and possible other information as described in further detail below with respect to FIG. 5. The proactive intelligence model 303, as described above, is configured to provide both rule-based and cognitive remediation capabilities. The rule-based remediation capability is provided in step 401, where the proactive intelligence model 303 runs the telemetry data 410-1 against a set of rules, with the output being used in step 403 to determine ones of a set of devices or other managed IT assets 306 which are potentially affected IT assets. The cognitive remediation capabilities are provided by the processing of steps 405 through 417. In step 405, the logs 410-2 are analyzed to perform log vectorization. The log vectors and telemetry data 410-1 are then merged in step 407 to create asset signatures.

Service requests 410-3 are then analyzed in step 409 to identify asset signatures of ones of the managed IT assets 306 which are associated with the service requests 410-3. In step 411, the asset signatures identified in step 411 are compared against the asset signatures created in step 407 to find ones of the managed IT assets 306 which present similar signatures (e.g., signatures exhibiting at least a threshold level of similarity) as the IT assets associated with the service requests 410-3. If any similar ones of the managed IT assets 306 are found in step 411, the process flow 400 proceeds to step 419 where a determination is made as to whether there are any known remediations for the issues identified in the service requests 410-3. If the result of the step 419 determination is no, the process flow 400 performs a traditional or manual support process in step 421. If the result of the step 419 determination is yes, the process flow 400 proceeds to step 423 described below.

In step 413, the asset signatures for the managed IT assets 306 are subject to pattern lookup and remediation recommendation processing. Asset applicability coefficients for respective ones of the managed IT assets 306 are computed in step 415, and in step 417 a determination is made as to whether the asset applicability coefficient (e.g., for a group of two or more of the managed IT assets 306, or for any single one of the managed IT assets 306) exceeds a designated threshold. If the result of the step 417 determination is yes, the process flow 400 proceeds to step 423 described below.

In step 423, a remediation script or other action is deployed on one or more of the managed IT assets 306 (e.g., those indicated as being potentially affected IT assets in the step 403 determination, those whose asset applicability coefficient exceeds the threshold in the step 417 determination, those whose asset signatures exhibit at least the threshold similarity with an asset signature of an IT asset associated with one of the service requests 410-3 having a known remediation in step 419). In step 425, a remediation outcome is stored for each of the managed IT assets 306 on which the remediation script was deployed in step 423. In step 427, a determination is made as to whether the remediation was effective for each of the managed IT assets 306 on which the remediation script was deployed in step 423. If the result of the step 427 determination is no (e.g., remediation was not effective), rollback of the remediation script is performed in step 429. Following step 429, or if the result of the step 427 determination is yes (e.g., remediation was effective), remediation feedback is provided to the proactive intelligence model 303 in step 431. If the result of either the step 403 determination or the step 417 determination is no, the process flow 400 ends in block 433.

Figure 5:
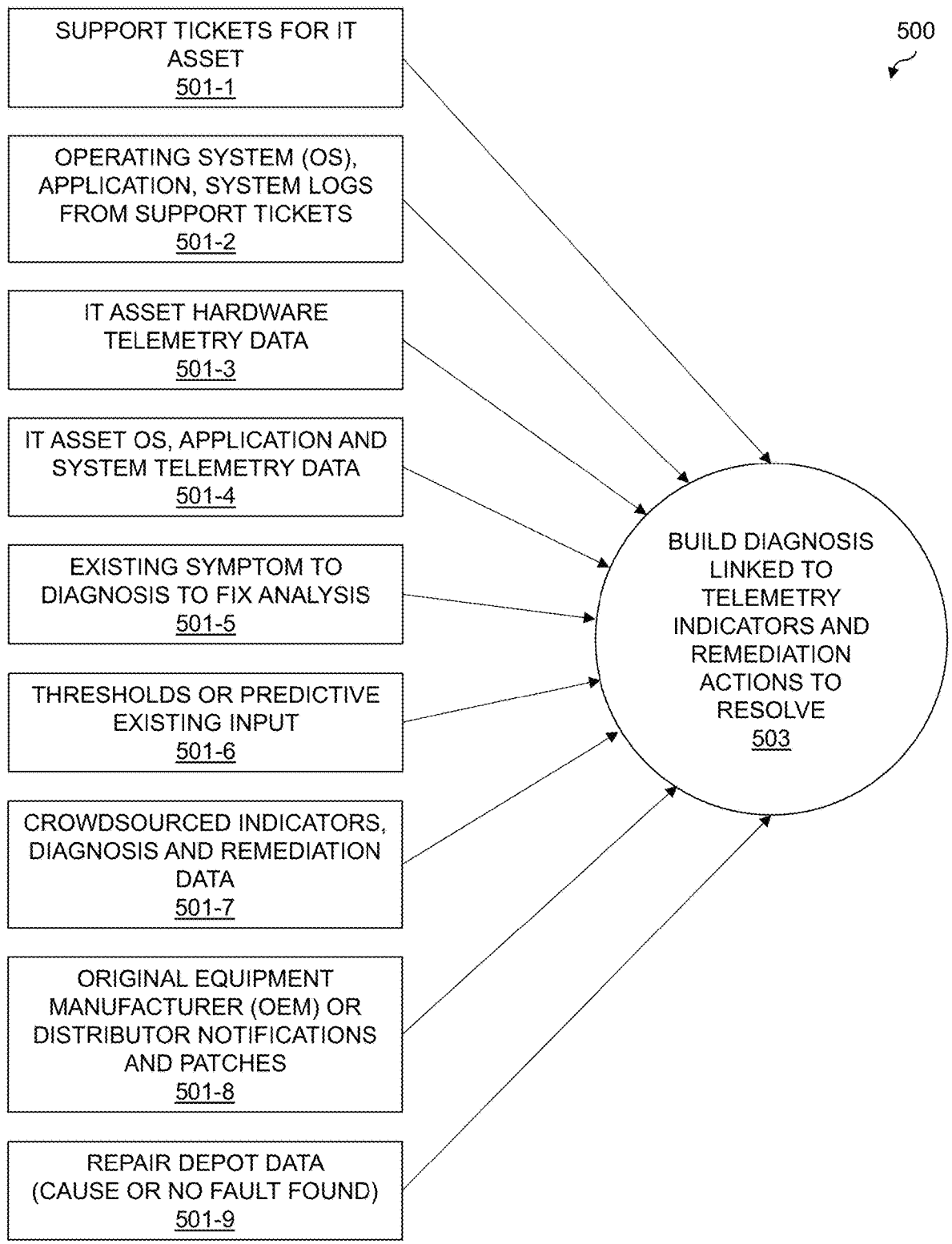
FIG. 5 shows an example collection of data sources which may be used to build a diagnosis that is linked to telemetry indicators and remediation actions in an illustrative embodiment.

The cognitive remediation includes curating telemetry data, logs and other sources to identify the pieces that present high correlation with support cases. Issue criticality is also identified through these data sources. The cognitive remediation thus enables learning from experience, data source availability and analysis which indicators and data sources should be part of the asset signatures that will be used for issue detection and remediation recommendation. FIG. 5 shows an example 500 of a mix of data sources 501-1 through 501-9 (collectively, data sources 501) which may be used as the "recipe" for creation of asset signatures in some embodiments. Here, the data sources 501 include: support tickets for IT assets 501-1; operating system (OS), application and system logs from support tickets 501-2; IT asset hardware telemetry data 501-3; IT asset OS, application and system telemetry data 501-4; existing symptom-to-diagnosis-to-fix analysis data 501-5; thresholds or predictive existing input 501-6; crowdsourced indicators, diagnosis and remediation data 510-7; original equipment manufacturer (OEM) or distributor notifications and patches 501-8; and repair depot data (cause or no fault found) 501-9. These data sources 501 are used in block 503 to build a diagnosis which is linked to telemetry indicators and remediation actions.

Consider, as an example, hard disk failures which are correlated with specific basic input-output system (BIOS) indicator logs. This correlation can be further enhanced by adding the dispatch and no fault found data associated with component repair information pulled into the model. This allows for potential soft remediation that is preemptive. If there is no association between a support case and logs (e.g., steps 409-411 in the process flow 400), it is still a possibility that related telemetry indicators will show effective correlations, helping to construct useful asset signature recipes more successfully (e.g., steps 413-415 in the process flow 400).

Asset signature creation from curated telemetry data 410-1 and logs 410-2 in step 407 will now be described in further detail. Any given correlations and other inputs are used to derive appropriate fleet (e.g., a group of IT assets) or individual asset signatures which are used to match remediation solutions with future issues. The technical solutions described herein provide for model-generated encoding of information necessary to represent the status of an IT asset, for ingestion by a model that can associate the created asset signature with issues and resolutions. IT asset-to-IT asset comparison informed by these inputs (e.g., their associated asset signatures) allows for issues not yet realized by an IT asset to be avoided.

IT asset signatures, also referred to herein as device signatures, are born from the need to consolidate information from different data sources and store the consolidated information or signals in an efficient way. The indicators that prove to be relevant for issue detection are encoded into numeric vectors (e.g., the log vectorization performed in step 405), which are then merged with telemetry data 410-1 to form the asset signatures for the managed IT assets 306. By looking at the commonalities between signatures of different ones of the managed IT assets 306 which are facing the same or similar issues, it is possible to learn "issue" signatures for specific issues which can be used in the future to proactively detect other ones of the managed IT assets 306 which may be affected by those issues.

Figure 6:
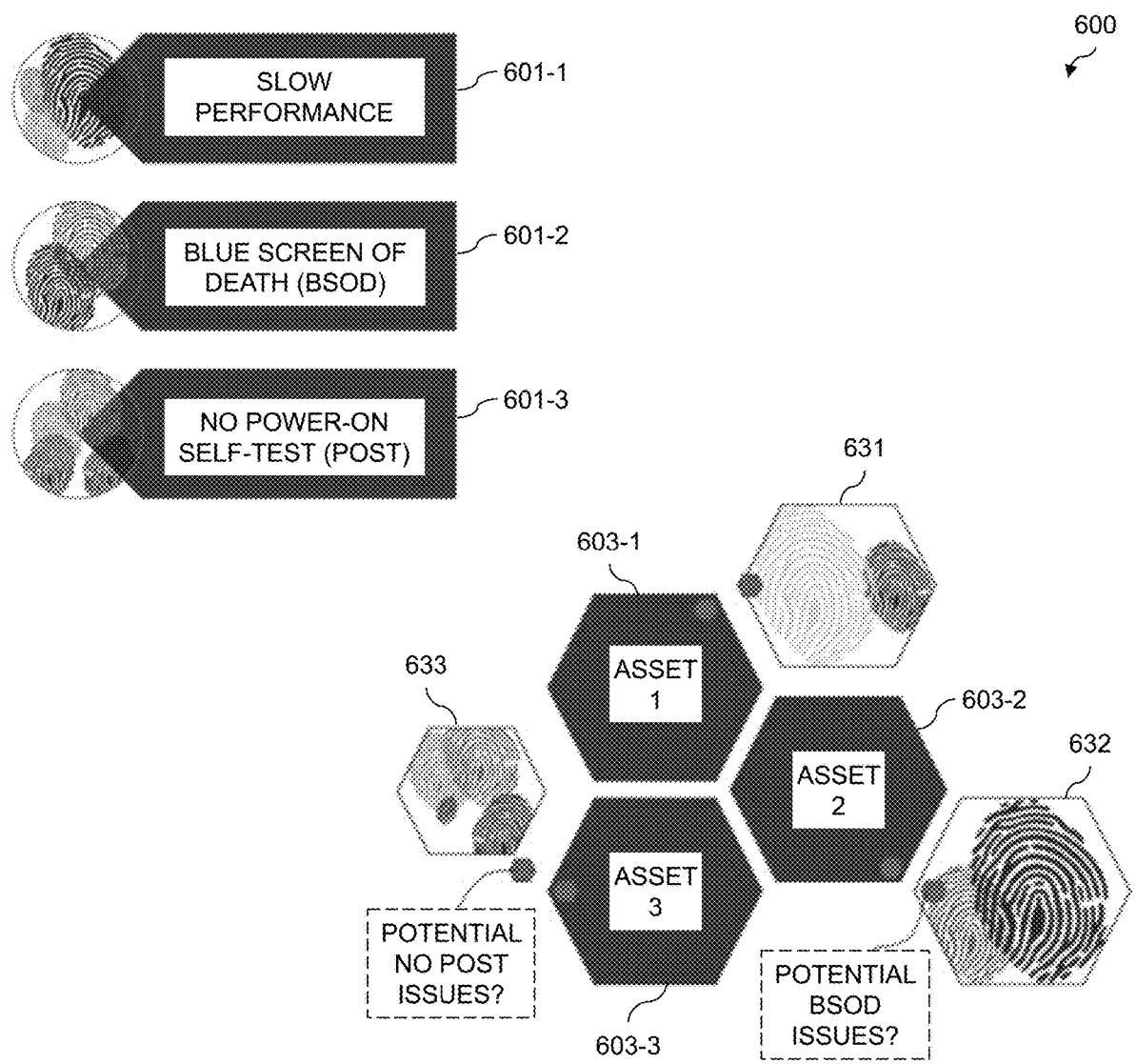
FIG. 6 shows an example of issue and information technology asset signatures in an illustrative embodiment.

The associations between the asset signature patterns and issues may be learned using an AI or other machine learning model, rather than being determined by a human user, which makes the model scalable (e.g., to potentially large fleets or groups of PCs or other types of IT assets). The asset and issue signatures allow IT asset-to-IT asset comparison as well as issue pattern-to-IT asset comparison in steps 411 and 413, making it possible to detect affected IT assets based on incoming service requests 410-3, and for issues not yet known by the model. This provides a differentiation from conventional approaches, which generally cannot determine potentially affected devices or IT assets for issues which are not yet known by, for example, a rules-based model. FIG. 6 shows an example 600 of three different issues with their associated issue patterns or signatures, including a slow performance issue 601-1, a blue screen of death (BSOD) issue 601-2, and a no power-on self-test (POST) issue 601-3. FIG. 6 also shows three IT assets 603-1, 603-2 and 603-3 (collectively, IT assets 603) with their associated asset signatures 631, 632 and 633, respectively. As can be seen, the signature 632 of the IT asset 603-2 closely resembles the pattern or signature of the BSOD 601-2 issue, while the asset signature 633 of IT asset 603-3 closely resembles the pattern or signature of the no POST issue 601-3. Thus, in the example 600 of FIG. 6, the IT assets 603-2 and 603-3 are potentially affected by known issues (e.g., BSOD and no POST). Various remediation actions may be recommended accordingly (e.g., by selecting a known remedial action for a known issue, or through automated generation of new remediation scripts as will be discussed in further detail below). It should be noted that the concept of asset "signatures" can be applied at the individual IT asset level, or at a group level (e.g., a group of two or more IT assets, such as a deployed PC fleet for an enterprise or other organization).

The asset applicability coefficients computed in step 415 in some embodiments are numerical representations of the probability of success and applicability of an intended solution or remediation action given the current health state of an IT asset or a group of IT assets, and optionally based on the criticality of issues. The technical solutions described herein advantageously provide a novel approach for successfully determining algorithm inputs and functions for the IT asset or IT asset group (e.g., a PC fleet) applicability of a curated remediation recommendation. The algorithm leverages experience in applying curated solutions to fleet problems and determining when the thresholds for applicability and success are reached for a validated solution.

In some embodiments, an algorithm for computing asset applicability coefficients is based on asset or asset group (e.g., fleet) "fingerprints" in telemetry and log indicators that are combined into signature packages. This could be a combination of characteristics of an IT asset or a group of IT assets. An example combination is the central processing unit (CPU) usage percentage (%), the number of disk pages, the number of disk writes, and a specific application (e.g., an .exe executable) running. If this combination indicates a signature of a potential problem with an identified remediation, then a determination may be made as to whether the identified remediation will be successful in remedying the issue based at least in part on the extent of the signature match. It could be that the signature has a 100% match for only one IT asset, but at 100% match the potential of the identified remediation resolving that IT asset's issue is high and the fleet or IT asset group applicability coefficient may be calculated as high. The applicability coefficient may be calculated as follows:

$$AC = criticality_{issue} * \left(\frac{1}{criticality_{device}}\right) * p_{success} * \% \ match_{signatures} * \frac{devices_{affected}}{devices_{total}}$$

where AC denotes the applicability coefficient, criticality$_{issue}$ denotes the issue criticality, criticality$_{device}$ denotes the device or IT asset criticality, p$_{success}$ denotes the probability of success of the identified remediation action, % match$_{signatures}$ denotes the percentage match of signatures, devices$_{affected}$ denotes the number of affected devices or IT assets, and devices$_{total}$ denotes the total number of devices or IT assets in the group (e.g., the fleet).

Using the applicability coefficient will allow the PRE service 300 to determine whether remediation should be attempted for an individual IT asset or group of IT assets (e.g., to determine whether the fleet or other group of IT assets contains the appropriate signatures), and to determine the likely impact that remediation will have on the individual IT asset or group of IT assets (e.g., based on various factors, such as issue criticality, device or IT asset criticality, number of devices or IT assets affected, the probability of success of the identified remediation, etc.). IT support staff or other authorized users may adjust the applicability coefficient if desired, such as based on the number of devices or IT assets affected, the criticality of a fix, the criticality or importance of the IT asset, etc. Ongoing analysis is used to continuously inform the thresholds to be used for determining similarity, for running remediation actions, for requesting custom help from IT staff, etc.

If, based on accepted thresholds, there is sufficient correlation for remediation, the curated and matched remediation solution is applied. Results of that remediation are logged for further analysis (e.g., to determine whether it is worth it to run the remediation scripts). The outcome is used to determine whether the solution used is stable enough to become a standard "rule" for the execution platform 305. These rules would generally be applied in a "ring" deployment so that the remediation of less critical or important IT assets is attempted before more critical or important IT assets (e.g., high value, strategic systems).

Figure 7:
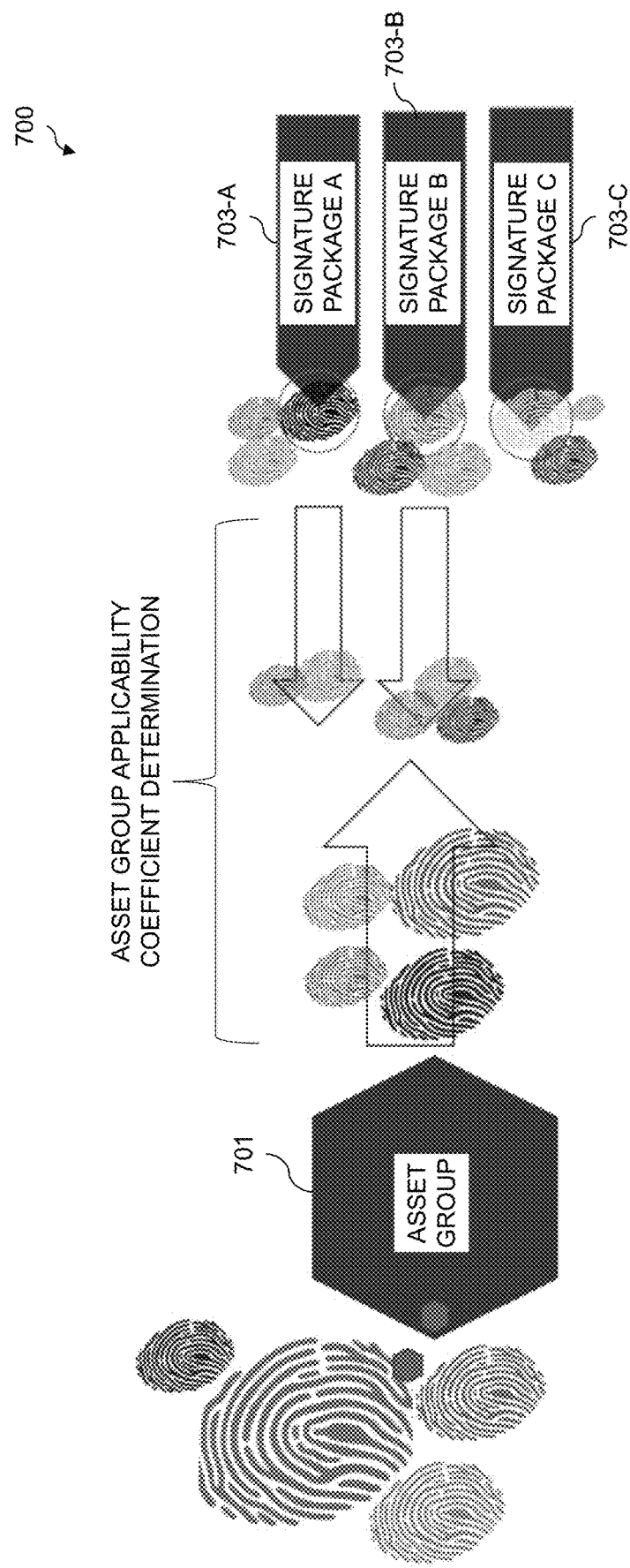
FIG. 7 shows an example of determination of an applicability coefficient for a group of information technology assets in an illustrative embodiment.

Consider, as an example, a situation in which 5 out of 100 devices in a fleet have only a 50% match of characteristics with an issue pattern or signature. In this case, the fleet's applicability coefficient would be calculated as low. FIG. 7 shows an example 700 of determining an applicability coefficient for a group of IT assets 701. The IT asset group 701 is associated with a signature indicating, for example, an anomaly occurrence frequency (e.g., per IT asset in the IT asset group 701), an anomaly value range check (e.g., per IT asset in the IT asset group 701), and an existence of other fingerprints (e.g., per IT asset in the IT asset group 701). The signature of the IT asset group 701 is then compared against a set of signature packages 703-A, 703-B and 703-C (collectively, signature packages 703) for different issues with identified remediation solutions. Each of the signature packages 703 indicates a defined anomaly frequency, a defined telemetry acceptable range, and fingerprint packages. Using the equation above, the fleet or IT asset group 701 applicability coefficient may be computed to evaluate a remediation action's potential impact (e.g., relative to previous remediation actions performed by the system).

The identification or selection of a remediation action may vary. In some cases, there may be known remediation actions for a given issue. Thus, when the signature of an IT asset or a group of IT assets matches the signature or pattern of the given issue, the known remediation actions may be applied (e.g., corresponding to a rule-based analysis in steps 401-403 of the process flow 400, a positive determination in step 419 in the process flow 400, or the processing branch including steps 413-415 in the process flow 400, etc.). In other cases, however, the given issue may not have any known remediation actions (e.g., where in the rule-based analysis of step 401 in the process flow 400 one or more rules have not been defined for the given issue, where an issue pattern that is looked up in step 413 of the process flow 400 has no associated recommended remediation action, where the result of the step 419 determination is no, etc.). Where there are no known remediation actions for the given issue, manual support process may be triggered (e.g., step 421 in the process flow 400). The technical solutions described herein, however, provide another option where the proactive intelligence model 303 is able to automatically generate remediation actions (e.g., scripts) to be applied for different issues (e.g., issues that do not have any known remediation actions, issues which have known remediation actions that are not considered effective, issues for which it is desired to come up with alternatives to known remediation actions, etc.).

The proactive intelligence model 303 works with various inputs, parameters and output criteria to generate signed scripts for use in the execution platform 305. The technical solutions described herein therefore provide a novel approach for automatic recognition of a correct solution, and for combining curated, network-created (e.g., by IT staff of a vendor of IT assets, by IT staff in customer environments, etc.), crowdsourced and existing platform-generated solutions (e.g., AI scripts, vendor-generated scripts, customer-generated scripts, etc.) to create fleet or individual IT asset-safe, issue-specific remediation scripts. The proactive intelligence model 303 may utilize AI and machine learning for creating the fleet or individual IT asset-safe and issue-specific remediation scripts. In some embodiments, the generated scripts are written using best practices, up-to-date software versions, and are made future-proof where possible. The generated scripts may be automatically updated on a regular basis, and may be tagged with applicability coefficients and remediation signatures. The generated scripts may be staged or tested, and uploaded to the execution platform 305. The proactive intelligence model 303 will also update itself and the execution platform 305 to track given issues for which there are no known solutions (and thus require a custom-generated remediation script). Any manually-created custom remediation scripts addressing the same issue may be analyzed against the automatically generated remediation scripts for the best fit, and may be used to create or define new rules for the proactive intelligence model 303 and the execution platform 305.

Conventional approaches suffer from various technical problems, in that they are generally based on only a limited set of scripting resources. Additionally, conventional script generation tools typically focus on generating scripts from manual actions performed by humans (e.g., by a human user interfacing with a user interface (UI) or typing sub-scripts into a command line interface (CLI) tool). The technical solutions described herein actively survey solutions and issues to autonomously write scripts without direct human manual input, combining input from various data sources including crowdsourced solutions, scripts provided by IT, support and/or engineering staff, customer solutions, established scripting rules, device logs, support ticket details, etc., as well as the applicability coefficient and fleet or individual IT asset signatures to create remediation scripts. Such remediation scripts are both stable enough to run on a wide variety of IT assets with minimal negative impact to performance, and are specific enough to address the exact issue or issues seen by the IT assets in a group of managed IT assets (e.g., any customer fleet). The proactive intelligence model 303 is also guided by the rate of success or failure of the automatically generated remediation scripts through the feedback mechanisms of the PRE service 300 and the process flow 400 (e.g., by considering whether the automatically generated remediation scripts do or do not provide effective remediation for individual IT assets).

Figure 8:
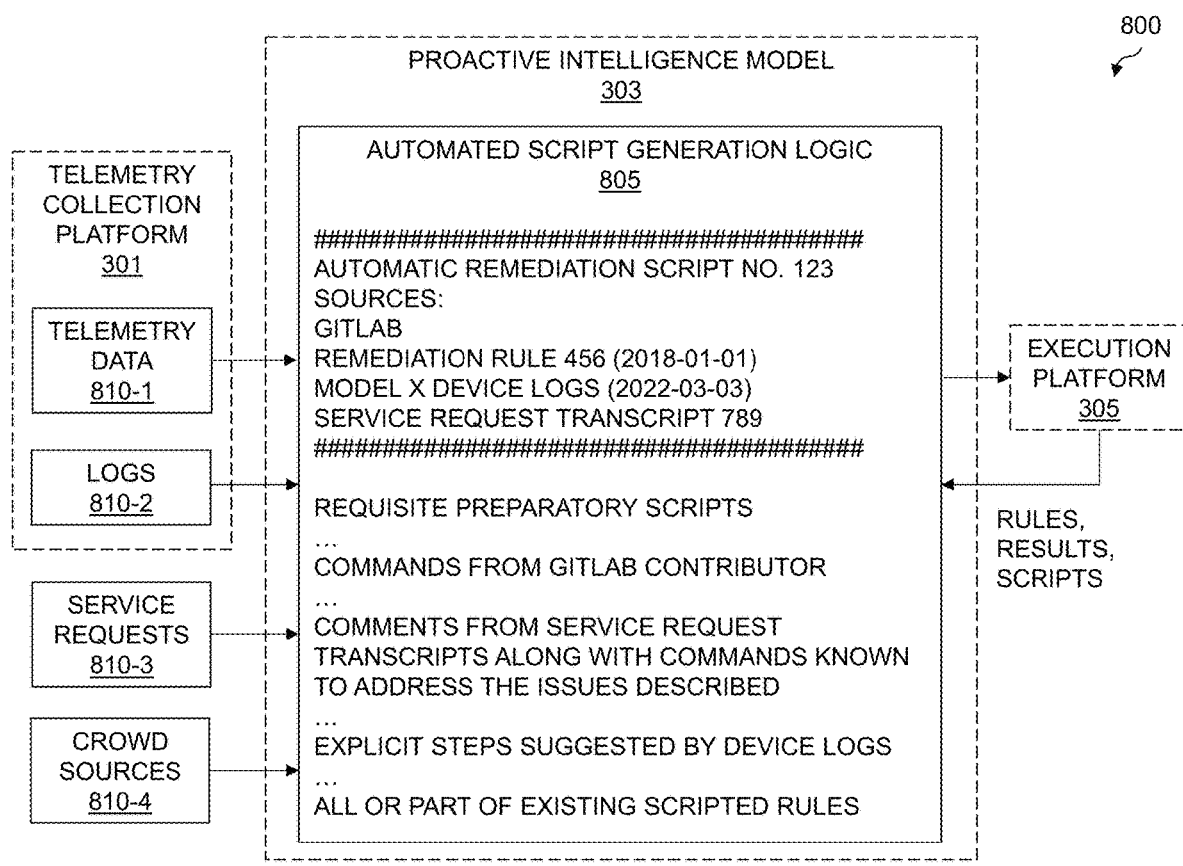
FIG. 8 shows a system flow for automated remediation script generation in an illustrative embodiment.

FIG. 8 shows a process flow 800 for automated script generation logic 805 implemented by the proactive intelligent model 303. Here, the automated script generation logic 805 takes various inputs, including telemetry data 810-1 and logs 810-2 from the telemetry collection platform 301, service requests 810-3, crowd sources 810-4, and rules, results and scripts which are known to and utilized by the execution platform 305. The inputs thus include, but are not limited to, remediation outcomes, applicable fleet/IT asset signatures (e.g., where the signatures include telemetry and logs of direct fixes derived from log vectorization analysis), unique device/application/component parameters, support ticket information, scripts (e.g., human or AI-generated scripts based on support case data, prior remediations, and existing rules), outputs from existing models, code (e.g., patches) provided by OS and other software vendors, crowd-sourced solutions (e.g., from GitLab), etc. The parameters used include creation, run approval and device or IT asset selection. The parameters may be determined at least in part based on remediation criticality, success rate, and source (e.g., trusted or non-trusted vendors, crowdsourced, IT professionals, etc.). Additionally, the proactive intelligence model 303 will decide whether to deliver and run the remediation scripts on the execution platform 305 based on the outcome of script staging. The automated script generation logic 805 provides as output remediation scripts which are paired with lists or other indicators of the devices or other IT assets (e.g., including the OS, applications, etc.) on which the remediation scripts are approved to run, as well as severity/criticality parameter information.

Consider, as an example, a device or IT asset which registers error code 1, with suggestions to set registry key H1 to 0. The user of the device or IT asset calls into IT support about an error related to an application which references H1 in its startup scripts, and that call information is logged (e.g., as a support ticket or service request). Several years ago, a user "bob123" on GitLab created a script to check for the value of H1 and set it to 0, along with changing some other system settings (e.g., registry keys H3, H45, H50 and H90) dependent on the value of H1. The automated script generation logic 805 implemented by the proactive intelligence model 303 correctly identifies the need to set H1 to 0, curates the correlation between the issue, the system and the application, analyzes bob123's contribution on GitLab for scripting accuracy, and generates a script to set H1 to 0 while changing H3 to 1 and verifying that H50 remains 1. The automated script generation logic 805 uses generic registry key editing scripts which are already part of the execution platform 305, and incorporates changes to additional registry keys from bob123's input (e.g., while disregarding other non-applicable changes to registry keys). Additionally, the automated script generation logic 805 recognizes from the support ticket that the application in question, installed on that specific IT asset, performs better when certain startup patterns are turned off and when registry key H67 is set to 1, and those changes are made as well. All applicable rollback steps are also created, and the package is pushed to the affected IT assets via the execution platform 305.

The technical solutions described herein provide numerous advantages relative to conventional approaches, which depend heavily on reactive manual intervention to trigger remediations and remotely control IT assets for troubleshooting and issue resolution. Conventional AI models also offer limited hardware failure prediction functionality.

Figure 10:
FIG. 10 shows a heat map plot for tokens composing logs and their association to different issues in an illustrative embodiment.

Validation of the importance of different data sources for predicting known issues will now be described. FIG. 9A shows a table 900 showing the results of five classification models, four trained on single data sources (BIOS, crash, diagnostic performance event, and application error logs), and one trained on the combination of BIOS, crash, diagnostic performance event, and application error logs. The table 900 only displays values where the area under the Receiver Operator Characteristic (ROC) curve is greater than 0.6. FIG. 9B shows a table 905 with descriptions of the different fix codes in the first column of the table 900 of FIG. 9A. Although this analysis is not exhaustive and does not include all the possible data sources, the results shown in the table 900 of FIG. 9A suggest that there are logs with more predictive power for specific issues and, in some cases, a combination of sources achieves a better result (e.g., for slow performance issues). Besides the classification task, tokens composing the logs and their association to different issues is also considered. FIG. 10 shows a heat map plot 1000 with results of the analysis for BIOS logs, where color intensity is based on the average importance of a token for an issue. As can be seen from the plot 1000, unique tokens light up for the hard drive issue thus helping to identify the problem.

It is to be appreciated that the particular advantages described above and elsewhere herein are associated with particular illustrative embodiments and need not be present in other embodiments. Also, the particular types of information processing system features and functionality as illustrated in the drawings and described above are exemplary only, and numerous other arrangements may be used in other embodiments.

Illustrative embodiments of processing platforms utilized to implement functionality for proactive remediation for IT assets of an IT infrastructure will now be described in greater detail with reference to FIGS. 11 and 12. Although described in the context of system 100, these platforms may also be used to implement at least portions of other information processing systems in other embodiments.

Figure 11:
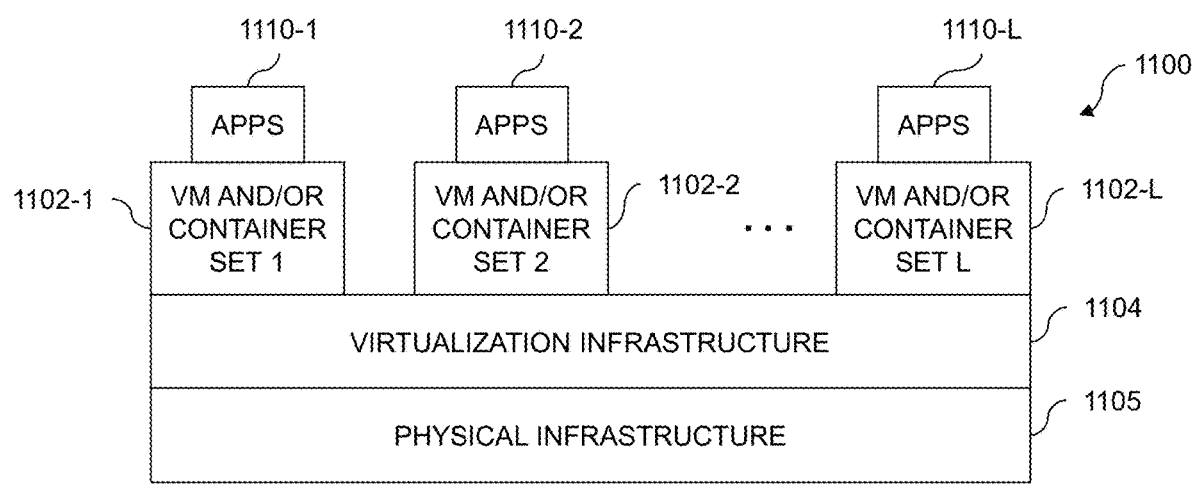
FIGS. 11 and 12 show examples of processing platforms that may be utilized to implement at least a portion of an information processing system in illustrative embodiments.
Figure 12:
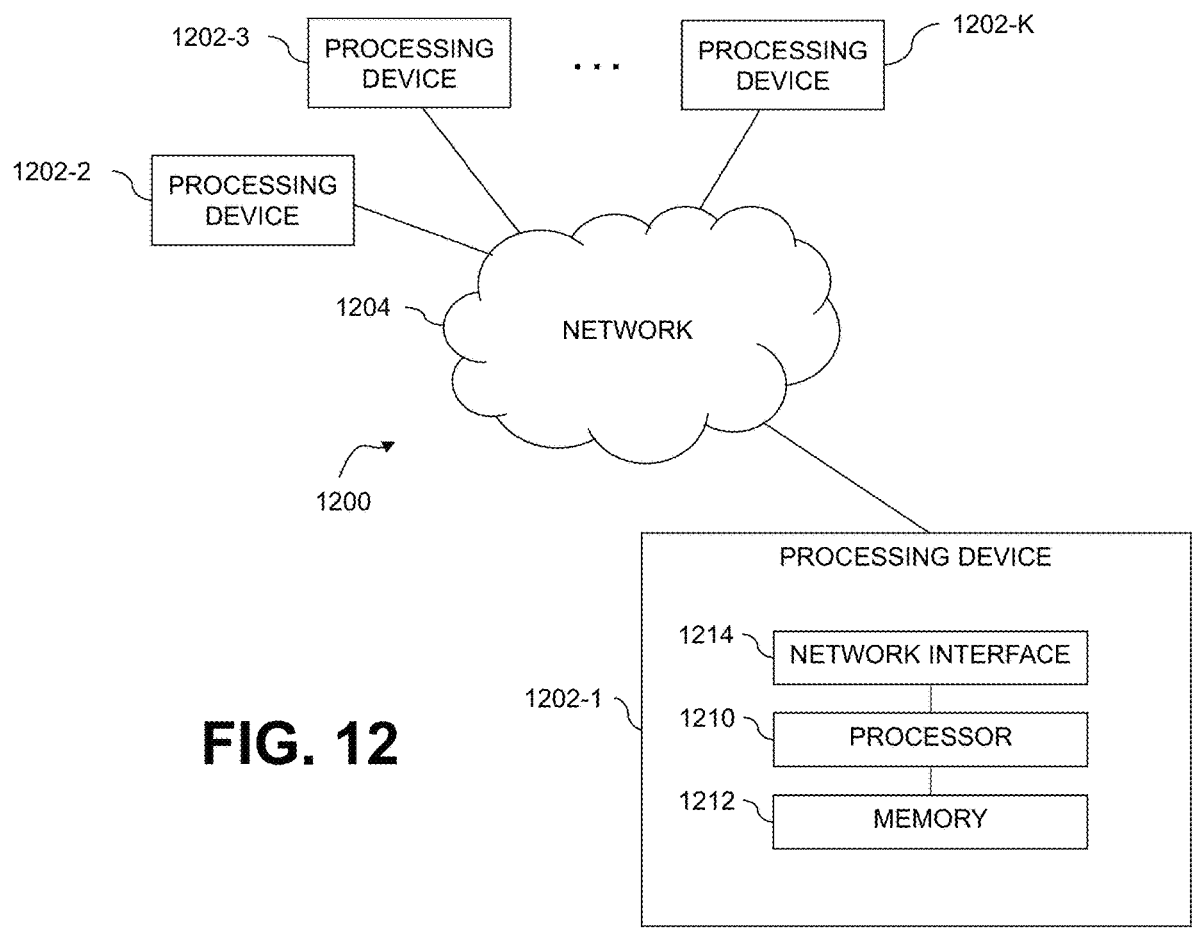

FIG. 11 shows an example processing platform comprising cloud infrastructure 1100. The cloud infrastructure 1100 comprises a combination of physical and virtual processing resources that may be utilized to implement at least a portion of the information processing system 100 in FIG. 1. The cloud infrastructure 1100 comprises multiple virtual machines (VMs) and/or container sets 1102-1, 1102-2, . . . 1102-L implemented using virtualization infrastructure 1104. The virtualization infrastructure 1104 runs on physical infrastructure 1105, and illustratively comprises one or more hypervisors and/or operating system level virtualization infrastructure. The operating system level virtualization infrastructure illustratively comprises kernel control groups of a Linux operating system or other type of operating system.

The cloud infrastructure 1100 further comprises sets of applications 1110-1, 1110-2, 1110-L running on respective ones of the VMs/container sets 1102-1, 1102-2, . . . 1102-L under the control of the virtualization infrastructure 1104. The VMs/container sets 1102 may comprise respective VMs, respective sets of one or more containers, or respective sets of one or more containers running in VMs.

In some implementations of the FIG. 11 embodiment, the VMs/container sets 1102 comprise respective VMs implemented using virtualization infrastructure 1104 that comprises at least one hypervisor. A hypervisor platform may be used to implement a hypervisor within the virtualization infrastructure 1104, where the hypervisor platform has an associated virtual infrastructure management system. The underlying physical machines may comprise one or more distributed processing platforms that include one or more storage systems.

In other implementations of the FIG. 11 embodiment, the VMs/container sets 1102 comprise respective containers implemented using virtualization infrastructure 1104 that provides operating system level virtualization functionality, such as support for Docker containers running on bare metal hosts, or Docker containers running on VMs. The containers are illustratively implemented using respective kernel control groups of the operating system.

As is apparent from the above, one or more of the processing modules or other components of system 100 may each run on a computer, server, storage device or other processing platform element. A given such element may be viewed as an example of what is more generally referred to herein as a "processing device." The cloud infrastructure 1100 shown in FIG. 11 may represent at least a portion of one processing platform. Another example of such a processing platform is processing platform 1200 shown in FIG. 12.

The processing platform 1200 in this embodiment comprises a portion of system 100 and includes a plurality of processing devices, denoted 1202-1, 1202-2, 1202-3, . . . 1202-K, which communicate with one another over a network 1204.

The network 1204 may comprise any type of network, including by way of example a global computer network such as the Internet, a WAN, a LAN, a satellite network, a telephone or cable network, a cellular network, a wireless network such as a WiFi or WiMAX network, or various portions or combinations of these and other types of networks.

The processing device 1202-1 in the processing platform 1200 comprises a processor 1210 coupled to a memory 1212.

The processor 1210 may comprise a microprocessor, a microcontroller, an application-specific integrated circuit (ASIC), a field-programmable gate array (FPGA), a central processing unit (CPU), a graphical processing unit (GPU), a tensor processing unit (TPU), a video processing unit (VPU) or other type of processing circuitry, as well as portions or combinations of such circuitry elements.

The memory 1212 may comprise random access memory (RAM), read-only memory (ROM), flash memory or other types of memory, in any combination. The memory 1212 and other memories disclosed herein should be viewed as illustrative examples of what are more generally referred to as "processor-readable storage media" storing executable program code of one or more software programs.

Articles of manufacture comprising such processor-readable storage media are considered illustrative embodiments. A given such article of manufacture may comprise, for example, a storage array, a storage disk or an integrated circuit containing RAM, ROM, flash memory or other electronic memory, or any of a wide variety of other types of computer program products. The term "article of manufacture" as used herein should be understood to exclude transitory, propagating signals. Numerous other types of computer program products comprising processor-readable storage media can be used.

Also included in the processing device 1202-1 is network interface circuitry 1214, which is used to interface the processing device with the network 1204 and other system components, and may comprise conventional transceivers.

The other processing devices 1202 of the processing platform 1200 are assumed to be configured in a manner similar to that shown for processing device 1202-1 in the figure.

Again, the particular processing platform 1200 shown in the figure is presented by way of example only, and system 100 may include additional or alternative processing platforms, as well as numerous distinct processing platforms in any combination, with each such platform comprising one or more computers, servers, storage devices or other processing devices.

For example, other processing platforms used to implement illustrative embodiments can comprise converged infrastructure.

It should therefore be understood that in other embodiments different arrangements of additional or alternative elements may be used. At least a subset of these elements may be collectively implemented on a common processing platform, or each such element may be implemented on a separate processing platform.

As indicated previously, components of an information processing system as disclosed herein can be implemented at least in part in the form of one or more software programs stored in memory and executed by a processor of a processing device. For example, at least portions of the functionality for proactive remediation for IT assets of an IT infrastructure as disclosed herein are illustratively implemented in the form of software running on one or more processing devices.

It should again be emphasized that the above-described embodiments are presented for purposes of illustration only. Many variations and other alternative embodiments may be used. For example, the disclosed techniques are applicable to a wide variety of other types of information processing systems, information technology assets, remediation actions, etc. Also, the particular configurations of system and device elements and associated processing operations illustratively shown in the drawings can be varied in other embodiments. Moreover, the various assumptions made above in the course of describing the illustrative embodiments should also be viewed as exemplary rather than as requirements or limitations of the disclosure. Numerous other alternative embodiments within the scope of the appended claims will be readily apparent to those skilled in the art.

What is claimed is:

1. An apparatus comprising:
at least one processing device comprising a processor coupled to a memory;
the at least one processing device being configured:
to obtain monitoring data associated with a plurality of information technology assets in an information technology infrastructure;
to generate, for at least a given one of the plurality of information technology assets, a given asset signature based at least in part on the obtained monitoring data, the given asset signature representing a status of the given information technology asset;
to determine asset-to-issue similarity between the given asset signature and one or more issue signatures, the one or more issue signatures characterizing presence of a plurality of issue indicators relevant for issue detection for one or more issues encountered on one or more of the plurality of information technology assets;
to select, responsive to determining that the given asset signature exhibits at least a threshold level of asset-to-issue similarity with at least a given one of the one or more issue signatures associated with at least a given one of the one or more issues, one or more proactive remedial actions for remedying the given issue; and to apply the selected one or more proactive remedial actions to the given information technology asset prior to detecting that the given information technology asset has encountered the given issue.

2. The apparatus of claim 1 wherein the plurality of information technology assets comprise at least one of physical computing resources and virtual computing resources.

3. The apparatus of claim 1 wherein the obtained monitoring data comprises telemetry data collected from the plurality of information technology assets, logs associated with the plurality of information technology assets, and service requests associated with the plurality of information technology assets.

4. The apparatus of claim 1 wherein the obtained monitoring data comprises, for the given information technology asset:
  one or more support tickets associated with the given information technology asset;
  operating system, application and system logs associated with the one or more support tickets;
  hardware telemetry data collected from the given information technology asset; and
  software telemetry data collected from one or more operating systems and applications running on the given information technology asset.

5. The apparatus of claim 1 wherein the obtained monitoring data comprises, for the given information technology asset:
  crowdsourced issue indicators and at least one of diagnosis and remediation data for the crowdsourced issue indicators;
  notifications and patches supplied by at least one of an original equipment manufacturer and a distributor of the given information technology asset; and
  repair depot data from one or more repair centers.

6. The apparatus of claim 1 wherein the given asset signature is generated for a group of two or more of the plurality of information technology assets including the given information technology asset, and wherein the selected one or more proactive remedial actions are applied to each information technology asset in the group of two or more of the plurality of information technology assets.

7. The apparatus of claim 1 wherein the given asset signature comprises a numeric vector encoding whether respective ones of the plurality of issue indicators are observed on the given information technology asset.

8. The apparatus of claim 1 wherein the given asset signature is generated for a group of two or more of the plurality of information technology assets including the given information technology asset, and wherein the given asset signature comprises a numeric vector encoding counts of numbers of information technology assets in the group of two or more of the plurality of information technology assets for which respective ones of the plurality of issue indicators are observed.

9. The apparatus of claim 1 wherein the at least one processing device is further configured:
  to identify one or more additional ones of the plurality of information technology assets having asset signatures exhibiting at least a threshold level of asset-to-asset similarity with the given asset signature; and
  to apply the selected one or more proactive remedial actions to the identified one or more additional ones of the plurality of information technology assets.

10. The apparatus of claim 1 wherein selecting the one or more proactive remedial actions comprises, for a given one of the one or more proactive remedial actions, determining an applicability coefficient characterizing a probability of success of the given proactive remedial action for remedying the given issue and applicability of the given proactive remedial action based at least in part on the status of the given information technology asset.

11. The apparatus of claim 10 wherein the applicability coefficient is determined based at least in part on an issue criticality of the given issue, an asset criticality of the given information technology asset, and a percentage match between the given asset signature and the given issue signature associated with the given issue.

12. The apparatus of claim 10 wherein the given asset signature is generated for a group of two or more of the plurality of information technology assets including the given information technology asset, and wherein the applicability coefficient is determined based at least in part on a comparison of (i) a number of information technology assets in the group of two or more of the plurality of information technology assets which are potentially affected by the given issue and (ii) a total number of information technology assets in the group of two or more of the plurality of information technology assets.

13. The apparatus of claim 1 wherein selecting the one or more proactive remedial actions comprises selecting one or more automatically generated remediation scripts based at least in part on the obtained monitoring data and remediation data from one or more additional data sources, the one or more additional data sources comprising at least one of a repository of previously-generated remediation scripts, patches provided by a hardware vendor of the given information technology asset, patches provided by one or more software vendors of software running on the given information technology asset, and crowdsourced solution data.

14. The apparatus of claim 13 wherein selecting the one or more automatically generated remediation scripts is further based at least in part on criticality information of the given issue, success rate for remediating the given issue utilizing the one or more automatically generated remediation scripts, and amounts of code in the one or more automatically generated remediation scripts obtained from respective ones of the one or more additional data sources.

15. A computer program product comprising a non-transitory processor-readable storage medium having stored therein program code of one or more software programs, wherein the program code when executed by at least one processing device causes the at least one processing device:
  to obtain monitoring data associated with a plurality of information technology assets in an information technology infrastructure;
  to generate, for at least a given one of the plurality of information technology assets, a given asset signature based at least in part on the obtained monitoring data, the given asset signature representing a status of the given information technology asset;
  to determine asset-to-issue similarity between the given asset signature and one or more issue signatures, the one or more issue signatures characterizing presence of a plurality of issue indicators relevant for issue detection for one or more issues encountered on one or more of the plurality of information technology assets;
  to select, responsive to determining that the given asset signature exhibits at least a threshold level of asset-to-issue similarity with at least a given one of the one or more issue signatures associated with at least a given one of the one or more issues, one or more proactive remedial actions for remedying the given issue; and to apply the selected one or more proactive remedial actions to the given information technology asset prior to detecting that the given information technology asset has encountered the given issue.

16. The computer program product of claim 15 wherein the given asset signature is generated for a group of two or more of the plurality of information technology assets including the given information technology asset, and wherein the selected one or more proactive remedial actions are applied to each information technology asset in the group of two or more of the plurality of information technology assets.

17. The computer program product of claim 15 wherein the given asset signature is generated for a group of two or more of the plurality of information technology assets including the given information technology asset, and wherein the given asset signature comprises a numeric vector encoding counts of numbers of information technology assets in the group of two or more of the plurality of information technology assets for which respective ones of the plurality of issue indicators are observed.

18. A method comprising:
   obtaining monitoring data associated with a plurality of information technology assets in an information technology infrastructure;
   generating, for at least a given one of the plurality of information technology assets, a given asset signature based at least in part on the obtained monitoring data, the given asset signature representing a status of the given information technology asset;
   determining asset-to-issue similarity between the given asset signature and one or more issue signatures, the one or more issue signatures characterizing presence of a plurality of issue indicators relevant for issue detection for one or more issues encountered on one or more of the plurality of information technology assets;
   selecting, responsive to determining that the given asset signature exhibits at least a threshold level of asset-to-issue similarity with at least a given one of the one or more issue signatures associated with at least a given one of the one or more issues, one or more proactive remedial actions for remedying the given issue; and
   applying the selected one or more proactive remedial actions to the given information technology asset prior to detecting that the given information technology asset has encountered the given issue;
   wherein the method is performed by at least one processing device comprising a processor coupled to a memory.

19. The method of claim 18 wherein the given asset signature is generated for a group of two or more of the plurality of information technology assets including the given information technology asset, and wherein the selected one or more proactive remedial actions are applied to each information technology asset in the group of two or more of the plurality of information technology assets.

20. The method of claim 18 wherein the given asset signature is generated for a group of two or more of the plurality of information technology assets including the given information technology asset, and wherein the given asset signature comprises a numeric vector encoding counts of numbers of information technology assets in the group of two or more of the plurality of information technology assets for which respective ones of the plurality of issue indicators are observed.

* * * * *